CURTAIN ASSEMBLY AND POWER DRIVE THEREFOR

Filed March 25, 1950 3 Sheets-Sheet 1

INVENTOR.
John H. Luckie
BY
Frank Keiper atty

Feb. 9, 1954 J. H. LUCKIE 2,668,586

CURTAIN ASSEMBLY AND POWER DRIVE THEREFOR

Filed March 25, 1950 3 Sheets-Sheet 2

INVENTOR.
John H. Luckie
BY
Frank Kiefer atty

INVENTOR.
John H. Luckie
BY
Frank Kiefer
atty

Patented Feb. 9, 1954 2,668,586

UNITED STATES PATENT OFFICE 2,668,586

CURTAIN ASSEMBLY AND POWER DRIVE THEREFOR

John H. Luckie, East Rochester, N. Y.

Application March 25, 1950, Serial No. 151,841

25 Claims. (Cl. 160—241)

Television pictures are displayed on a screen and the television apparatus is contained in a housing that surrounds and is behind the screen.

The object of this invention is to temporarily conceal the screen and the housing by a frame in which a curtain with a still picture thereon can be exposed when the television apparatus is not in operation, which picture will conceal the television set. It has other ornamental uses as well.

Another object of the invention is to provide the frame with two rollers which will carry a curtain on which a picture will be displayed.

Another object of the invention is to provide an apparatus by which the curtain and the picture can be drawn to an exposed position to conceal the television set or can be rolled up on one of the rollers so as to expose the television set and its screen, while the curtain is concealed.

These and other objects of the invention will be illustrated in the drawings, described in the specification and pointed out in the claims at the end thereof.

In the drawings.

In the drawings like reference numerals indicate like parts.

Figure 1:
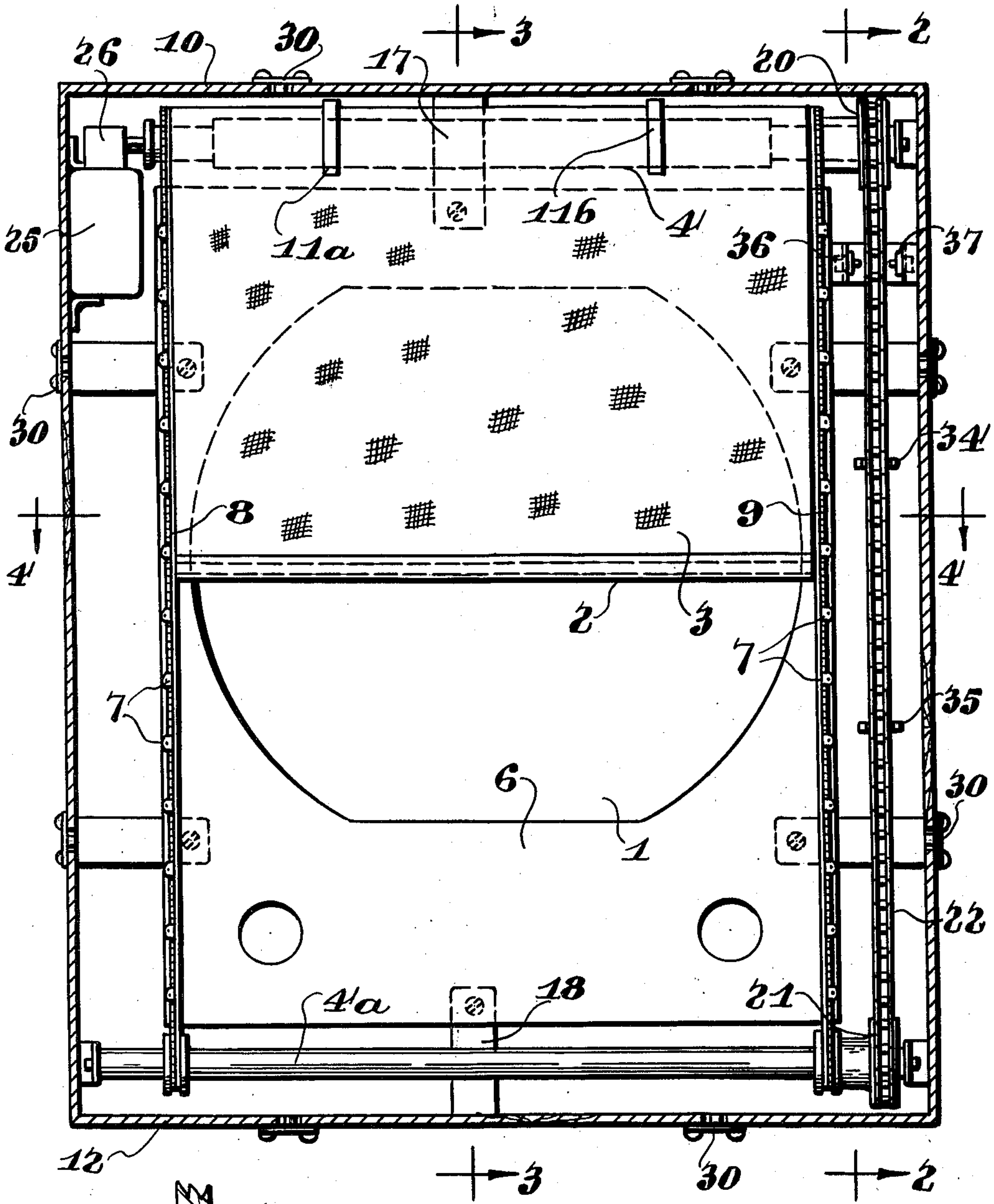
Fig. 1 is a front sectional view of the curtain and the apparatus by which it is drawn to exposed position or rolled up and concealed, the curtain being shown drawn half way down, and the section being taken on the line 1—1 of Fig. 2.

In the drawings, reference numeral 1 indicates the oval opening of the television set containing the screen on which the picture is displayed. The top half of this oval opening is shown in dotted lines because the lower edge 2 of the curtain 3 is drawn down to cover the upper half of the opening and leave the lower half exposed, which lower half is shown in full lines.

This curtain when it is fully drawn down conceals the television set and preferably carries some picture that is ornamental.

One end of this curtain is permanently attached to the upper roller 4 and when the curtain is drawn up and concealed it is wound around the roller 4.

On each side edge strip of the curtain 2 is fastened a marginal fabric strip similar to the fabric that is used on either side of a zipper fastening, it being understood that all zipper fastenings comprise two fabric strips, which can be joined together side by side by a series of small metallic interlocking clips that are carried by the strips.

The strip 8 on one side of a zipper fastening can be fastened on one edge of the curtain and the strip 9 on the other side of the zipper fastening can be fastened on the other edge of the curtain, it being understood that the metallic devices or clips on these strips do not engage with each other but these strips with their clips are used as a convenience to give a suitable stiff edging to the edge of the curtain.

The metallic clips on two strips of the zipper are joined together by a fastening device which can be moved along the strips in one direction to bring the metallic clips into interlocking engagement with each other or can be moved in the other direction to separate them.

As part of my invention I have found that a series of these fastening devices can be fastened stationary to each upright stationary side member of the frame in which the edges of the curtain runs, and the clips on the zipper strips can be passed through a series of these stationary fastening devices as the curtain is moved up and down, by which the edges of the curtain will be guided firmly in a vertical path and the curtain will be properly displayed without wrinkling.

Figures 2, 3, 5, 6, 8:
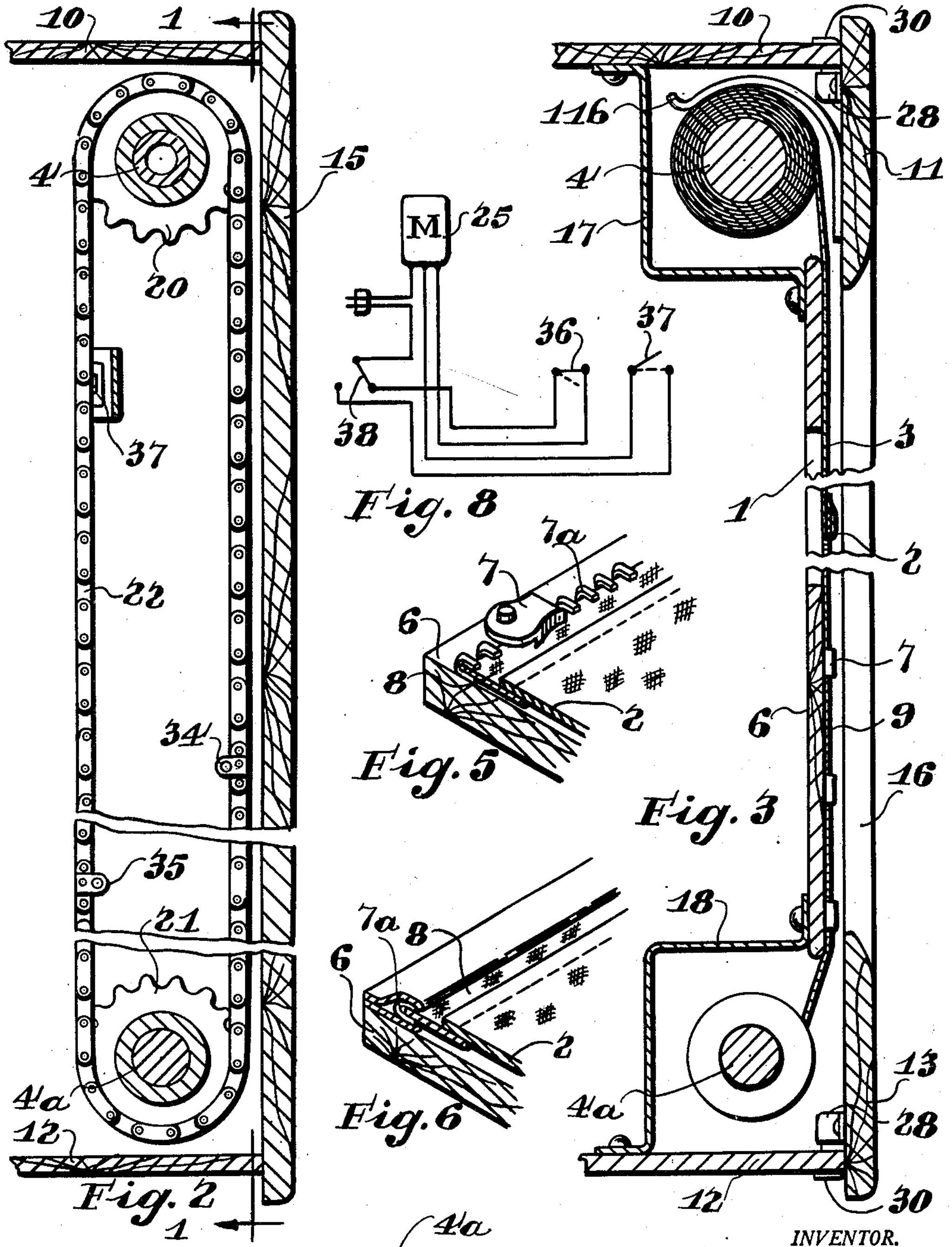
Fig. 2 is a vertical section taken on the line 2—2 of Fig. 1.
Fig. 3 is a vertical section taken on the line 3—3 of Fig. 1.
Fig. 5 is a perspective view of a part of the curtain shown in Fig. 1 with the marginal strip attached thereto.
Fig. 6 is a modified form of the curtain and the margin strip shown in Fig. 5.
Fig. 8 is a diagrammatic view of the electric circuit and the switches by which the current is fed to the motor and by which the motor is driven.

In Fig. 3 the reference numeral 6 indicates a stationary upright member of the frame that is used to guide the edge of the curtain. On the upright member 6, 6 at frequent intervals is placed a series of guiding or fastening devices 7, one of which is shown in perspective view in Fig. 5. These fastening devices are stationary on the upright member, and the clips 7a of the zipper strips 8 and 9 move under or through these fastening devices as the curtain moves so that the clips and the strips which carry them are firmly guided in a straight up and down path.

As shown in Fig. 1, thirteen of these stationary fastening or guiding devices 7 are shown on each side of the frame.

The zipper strip 8 which is fastened to the left hand side of the curtain 3 in Fig. 1 extends along the margin of the curtain and below it and the lower end of it is connected to the roller 4a at the bottom of Fig. 1, and in like manner the zipper strip 9 is fastened to the right hand side of the curtain and extends down below it and the lower end of it is fastened to the roller 4a at the bottom.

Neither of these zipper strips is endless. Each of them is about twice as long as the curtain. This is necessary because they connect the lower edge of the curtain to the lower roller when the curtain is wound up on the upper roller. As the roller 4a at the bottom of Fig. 1 turns, the zipper strips 8 and 9 are drawn down and wrapped around the roller and they draw the lower edge of the curtain down to the bottom of the frame so that it closes the opening 16 shown at the right in Fig. 3.

The housing which carries the television set and the roller is constructed as follows:

It comprises the top plate 10 and the upper horizontal member 11 and the bottom plate 12 and the lower horizontal member 13. It also comprises the upright members 14 and 15 on either side of the frame. Between the upright members 14 and 15 and the horizontal members 11 and 13 an opening 16 is exposed.

To the top plate 10 is attached at each corner of the frame or housing a short angle 17 and to the bottom plate 12 at each corner of the frame or housing is attached a short angle 18. These angles support the two stationary upright members 6 on which are carried the fastening or guiding devices 7 shown in Fig. 5. Under these guiding devices the clips 7a must pass as the curtain moves up and down.

On the right hand side in Fig. 1 and in Fig 2 is shown sprocket wheels 20 and 21. These sprocket wheels are carried on the rollers 4 and 4a and the rollers are driven thereby. For the purpose of driving the sprocket wheels, the endless sprocket chain 22 is provided.

The sprocket chain 22 drives the roller 4a at the bottom and is driven by the roller 4 at the top and this roller 4 is in turn driven by an electric motor 25 through a reducing gear box 26.

Figure 9:
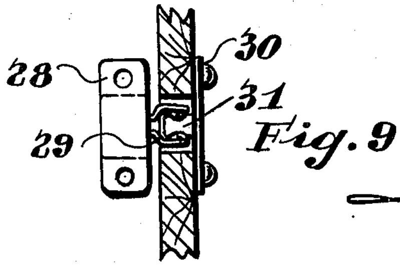
Fig. 9 is a detail view of one set of the brackets by which the front frame is fastened to the rest of the housing.

The front of the frame comprising the horizontal members 11 and 13 and the upright members 14 and 15 can be removed bodily to expose the parts of the assembly concealed thereby. For this purpose on each of the upright members 14 and 15 and on each of the horizontal members 11 and 13 is fastened two brackets such as are shown at 28 in Fig. 9. On each of these brackets is carried the spring clip 29. On the side panel of the frame is carried the bracket 30 on which is carried a pin 31, which pin engages with the spring clip 29 in a slip connection. As two of these are used on each of the four members of the front frame, eight of these bracket assemblies are used in all, and they make it possible to easily remove the front frame from the rest of the housing or to put it in place again.

Carried on the inside of the horizontal member 11 of the front frame are two spring clips 11a and 11b which engage over the curtain as it rolls up and unrolls and holds it against slipping as it is either up or down.

In Fig. 8 I have shown the electrical connections by which the motor is driven or controlled.

On the endless chain 22 is provided two cross bars 34 and 35 suitably spaced apart from each other as shown in Fig. 2. These cross bars approach the switches one at a time and are located between the switches. One of these switches is located on one side of the chain and the other switch is located on the other side of the chain as shown at the right in Fig. 1. The switches 36 and 37 stand parallel to each other as shown in Fig. 1 and are shown diagrammatically in Fig. 8. As the cross bar 34 moves up on the right hand side in Fig. 2 and down on the left hand side the curtain is drawn up at the same time and the endless chain 22 draws the cross bar 35 down on the left hand side and up on the right hand side in Fig. 2. This cross bar 35 does not make contact with the switches when the cross bar moves down from above. This cross bar 34 in approaching the switches 36 and 37 from above moves the switch 36 down from the full line position to the dotted line position in Fig. 8 and opens the circuit therefore stopping the movement of the chain, curtain and motor. It also moves the switch 37 from the full line position to the dotted line position closing the circuit on that side which remains inactive until the manually operated switch 38 is moved, to the left in Fig. 8. In the meantime both circuits are open. This movement of the chain 22 causes the curtain to be drawn up out of sight.

When the manual switch 38 is moved to the left in Fig. 8 then the circuit controlled by the switch 37 and the motor 25 is energized and the chain 22 moves in the reverse direction causing the cross bar 35 to move up in which case it closes the switch 36 and opens the switch 37.

This leaves both circuits open with the curtain drawn down and exposed until the manually operated switch 38 is moved again to cause the curtain to move in the other direction.

When the cross bar 35 is up and the contact 34 is down the curtain will be fully exposed and the television screen will be concealed and when the contact 34 has approached the switches from above and operated them, the curtain will be wound up and concealed and the television screen will be exposed.

Figure 7:
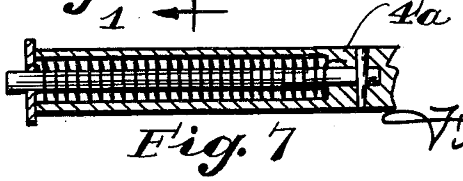
Fig. 7 is a sectional view of the torsion spring that is inserted in the rollers by which the curtain is drawn up or down.
Figure 4:
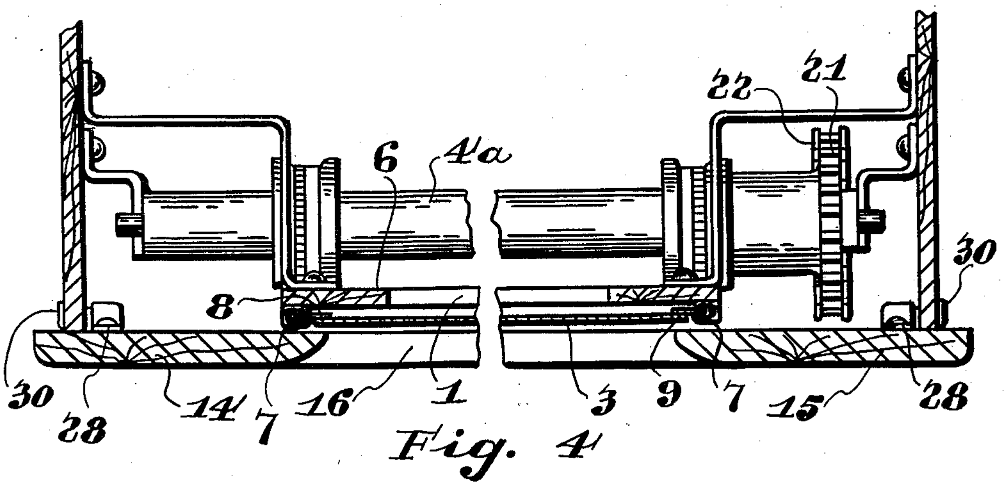
Fig. 4 is a horizontal section on the line 4—4 of Fig. 1.

In Fig. 7 I have shown a torsion spring such as is commonly used in roller curtains. One of these springs is placed in the right hand end of the upper roller 4 and another of these springs is placed in the left hand end of the lower roller 4a. When the curtain bar 2 is pulled down the torsional spring in the upper roller is wound up and the torsional spring in the lower roller is unwound. When the curtain is raised the torsional spring in the lower roller is wound up and the torsional spring in the upper roller is unwound.

It will be understood that this curtain supporting and operating device can be made separate from a television set and could be used to conceal a wall safe, a motion picture projector, etc., or it can be used for the ornamental purpose of closing any kind of an opening.

It will also be understood that by opening the manually operated switch 38 while the curtain is in motion, the curtain may be stopped in any desired position.

I claim:

1. A curtain assembly comprising a frame having horizontal top and bottom members and upright side members, an upper roller at the top of the frame with bearings therefor and a lower roller at the bottom of the frame with bearings therefor, a curtain having one end fastened to one of said rollers and the other end of the curtain left free, a horizontal reinforcing bar being fastened to the free end of the curtain, a flexible strip fastened to each side of the curtain and its roller and extending the length of the curtain and beyond the curtain and being attached to the other roller, each of said strips being about twice the length of the said curtain and about twice as long as the distance by which the centers of the rollers are spaced apart, a series of relatively closely spaced cleats on each of said strips, said strips and cleats being sufficiently flexible to roll upon either of said rollers, a series of guide members on each of the upright side members of the frame under which said cleats on the strips must pass as the horizontal curtain bar moves away from one roller and moves toward the other roller, said cleats and guide members coacting to tension said curtain laterally thereof.

2. A curtain assembly comprising a frame having horizontal top and bottom members and upright side members, an upper roller at the top of the frame with bearings therefor and a lower roller at the bottom of the frame with bearings therefor, a curtain having one end fastened to one of said rollers and the other end of the curtain left free, a horizontal reinforcing bar being fastened to the free end of the curtain, a flexible strip fastened to each side of the curtain and its roller and extending the length of the curtain and beyond the curtain and being attached to the other roller, each of said strips being about twice the length of the said curtain and about twice as long as the distance by which the centers of the rollers are spaced apart, a series of relatively closely spaced cleats on each of said strips, said strips and cleats being sufficiently flexible to roll upon either of said rollers, a series of guide members on each of the upright side members of the frame under which said cleats on the strips must pass as the horizontal curtain bar moves away from one roller and moves toward the other roller, said cleats and guide members coacting to tension said curtain laterally thereof, sprocket wheels on each of said rollers, an endless chain geared to said sprocket wheels for the purpose of causing said rollers to be rotated in unison.

3. In a curtain assembly the combination of a curtain and a roller, an endless chain for turning the roller, said endless chain having two parallel runs, two electric switches, one placed on each of the opposite sides of the endless chain, two cross bars on said endless chain suitably spaced apart thereon, one of said cross bars on approaching said switches from above opening one of the switches and closing the other switch thereby stopping the movement of the chain and curtain, the other cross bar on approaching said switches from below closing the first named switch and opening the second named switch thereby again stopping the movement of the chain and curtain, a manually operated switch for energizing the circuit containing the bar-closed switch in either case and starting the movement of the curtain in the opposite direction.

4. In a curtain assembly the combination of a curtain and a roller, an endless chain for turning the roller, said endless chain having two parallel runs, two electric switches, one placed on each of the opposite sides of the endless chain, circuits and a motor energizable through said switches, two cross bars on said endless chain, suitably spaced apart thereon, one of said cross bars on approaching said switches from above opening one of the switches and closing the other switch thereby deenergizing the circuit just opened and stopping the movement of the chain and curtain, the other cross bar on approaching said switches from below closing the first named switch and opening the second named switch, thereby deenergizing the newly opened circuit and again stopping the movement of the chain and curtain, a manually operated switch for energizing the circuit containing the bar-closed switch in either case and starting the movement of the curtain in the opposite direction.

5. A curtain assembly comprising a frame, spaced parallel rolls mounted at opposite ends of said frame, a flexible curtain operatively mounted upon said rolls and adapted to be drawn across said frame from one of said rolls, parallel guide means along the opposite sides of said frame and lying substantially in the plane of the curtain when drawn across said frame, means carried by the opposite side edges of the curtain and cooperating with said guide means, said guide means and side edge means on opposite sides of the curtain comprising a series of clips secured to the outer edges of said curtain, said clips being relatively narrow and spaced so as to flex with the curtain, each of said clips having inwardly contacting shoulder face means adapted to cooperate with outwardly directed surfaces of said guide means, said guide means and side edge means tensioning said curtain transversely thereof when drawn across said frame.

6. A curtain assembly comprising a frame, spaced parallel rolls mounted at opposite ends of said frame, a flexible curtain operatively mounted upon said rolls and adapted to be drawn across said frame from one of said rolls, parallel guide means along the opposite sides of said frame and lying substantially in the plane of the curtain when drawn across said frame, means carried by the opposite side edges of the curtain and cooperating with said guide means, said guide means and side edge means on opposite sides of the curtain comprising a series of clips secured to the outer edges of said curtain, said clips being relatively narrow and spaced so as to flex with the curtain, each of said clips having inwardly contacting shoulder face means adapted to cooperate with outwardly directed surfaces of said guide means, said guide means and side edge means tensioning said curtain transversely thereof when drawn across said frame, and reversible means to operate said rolls in one direction to draw said curtain across said frame, and in the other direction to roll said curtain on the one of said rolls.

7. A curtain assembly comprising a frame, spaced parallel rolls mounted at opposite ends of said frame, a flexible curtain operatively mounted upon said rolls and adapted to be drawn across said frame from one of said rolls, parallel guide means along the opposite sides of said frame and lying substantially in the plane of the curtain when drawn across said frame, means carried by the opposite side edges of the curtain and cooperating with said guide means, said guide means and side edge means on opposite sides of the curtain comprising a series of clips secured to the outer edges of said curtain, said clips being relatively narrow and spaced so as to flex with the curtain, each of said clips having inwardly contacting shoulder face means adapted to cooperate with outwardly directed surfaces of said guide means, said guide means and side edge means tensioning said curtain transversely thereof when drawn across said frame, reversible power means to operate said rolls in one direction to draw said curtain across said frame, and in the other direction to roll said curtain on the one of said rolls, and means responsive to movement of the curtain to a position when drawn across said frame or when rolled on said one roll, for establishing limits to stop said power means.

8. A curtain assembly comprising a frame, spaced parallel rolls mounted at opposite ends of said frame, a flexible curtain operatively mounted upon said rolls and adapted to be drawn across said frame from one of said rolls, parallel guide means of key slot section along the opposite sides of said frame and lying substantially in the plane of the curtain when drawn across said frame, flexible bead means carried by the opposite side edges of the curtain and sliding within said key slot section guide means, said guide means and side edge bead means on opposite sides of the curtain being so spaced as to act to tension said curtain transversely thereof when drawn across said frame.

9. A curtain assembly comprising a frame, spaced parallel rolls mounted at opposite ends of said frame, a flexible curtain operatively mounted upon said rolls and adapted to be drawn across said frame from one of said rolls, parallel guide means of key slot section along the opposite sides of said frame and lying substantially in the plane of the curtain when drawn across said frame, flexible bead means carried by the opposite side edges of the curtain and sliding within said key slot section guide means, said guide means and side edge bead means on opposite sides of the curtain being so spaced as to act to tension said curtain transversely thereof when drawn across said frame, and reversible means to operate said rolls in one direction to draw said curtain across said frame, and in the other direction to roll said curtain on the one of said rolls.

10. A curtain assembly comprising a frame, spaced parallel rolls mounted at cpposite ends of said frame, a flexible curtain operatively mounted upon said rolls and adapted to be drawn across said frame from one of said rolls, parallel guide means of key slot section along the opposite sides of said frame and lying substantially in the plane of the curtain when drawn across said frame, flexible bead means carried by the opposite side edges of the curtain and sliding within said key slot section guide means, said guide means and side edge bead means on opposite sides of the curtain being so spaced as to act to tension said curtain transversely thereof when drawn across said frame, reversible power means to operate said rolls in one direction to draw said curtain across said frame, and in the other direction to roll said curtain on the one of said rolls, and means responsive to movement of the curtain to a position when drawn across said frame or when rolled on said one roll for establishing limits to stop said power means.

11. A curtain assembly comprising a frame, spaced parallel rolls mounted at opposite ends of said frame, a flexible curtain operatively mounted upon said rolls and adapted to be drawn across said frame from one of said rolls, parallel guide means along the opposite sides of said frame and lying substantially in the plane of the curtain when drawn across said frame and having guiding edges facing away from said curtain, flexible means carried by the opposite side edges of the curtain and overlying and riding on said guiding edges, said guide means and said side edge means on opposite sides of the curtain tensioning said curtain transversely thereof when drawn across said frame.

12. In a curtain assembly, a pair of spaced parallel rolls, means for supporting said rolls in spaced relation, a flexible curtain for said rolls of a length approximating the distance between said rolls, marginal flexible strips secured along the opposite side edges of said curtain and extending beyond one end of said curtain, said curtain and strips being connected to one of said rolls for rolling and unrolling therefrom, and the extending ends of said strips being connected to the other of said rolls, flexible clip means secured to the outer edges of said strips, and parallel spaced guide means mounted on said supporting means extending along the outer edges of the unrolled portion of said strips, said guide means comprising opposed guiding elements coacting with said clips to tension said curtain laterally thereof.

13. In a curtain assembly, a pair of spaced parallel rolls, means for supporting said rolls in spaced relation, a flexible curtain for said rolls of a length approximating the distance between said rolls, marginal flexible strips secured along the opposite side edges of said curtain and extending beyond one end of said curtain, said curtain and strips being connected to one of said rolls for rolling and unrolling therefrom, and the extending ends of said strips being connected to the other of said rolls, flexible clip means secured to the outer edges of said strips, parallel spaced guide means mounted on said supporting means extending along the outer edges of the unrolled portion of said strips, said guide means comprising opposed guiding elements coacting with said clips to tension said curtain laterally thereof, and a stiffening element secured along the end edge of said curtain from which the extending ends of said strip extend.

14. In a curtain assembly, a pair of spaced parallel rolls, means for supporting said rolls in spaced relation, a flexible curtain for said rolls of a length approximating the distance between said rolls, marginal flexible strips secured along the opposite side edges of said curtain and extending beyond one end of said curtain, said curtain and strips being connected to one of said rolls for rolling and unrolling therefrom, and the extending ends of said strips being connected to the other of said rolls, flexible clip means secured to the outer edges of said strips, parallel spaced guide means mounted on said supporting means extending along the outer edges of the unrolled portion of said strips, said guide means comprising oppositely facing guiding elements coacting with said clips to tension said curtain laterally thereof, and reversible means for driving one roll and the other for unrolling and rolling said curtain on said one roll, and curtain position responsive means for controlling said driving means.

15. In a curtain assembly, a pair of spaced parallel rolls, means for supporting said rolls in spaced relation, a flexible curtain for said rolls of a length approximating the distance between said rolls, marginal flexible strips secured along the opposite side edges of said curtain and extending beyond one end of said curtain, said curtain and strips being connected to one of said rolls for rolling and unrolling therefrom, and the extending ends of said strips being connected to the other of said rolls, flexible clip means secured to the outer edges of said strips, parallel spaced guide means mounted on said supporting means extending along the outer edges of the unrolled portion of said strips, said guide means comprising opposed guiding elements coacting with said clips to tension said curtain laterally thereof, a stiffening element secured along the end edge of said curtain from which the extending ends of said strip extend, and reversible means for selectively driving said rolls for unrolling and rolling said curtain on said one roll, and curtain position responsive means for controlling said driving means.

16. A curtain for use in a curtain assembly having spaced rolls and laterally extending stationary guide means having outwardly directed guide surfaces; comprising, a rectangular flexible curtain, flexible side strips secured to the side edges of said curtain, said side strips extending beyond one end of the curtain a distance substantially the length of said curtain, and a series of clips secured to the outer edges of said side strips along the length of said curtain, said clips being relatively narrow and spaced and flexing with said strips, and each of said clips having inwardly facing shoulder face means adapted to cooperate with outwardly directed guide surfaces of the stationary guide means mounted therealong, whereby said curtain may be tensioned laterally by coaction with said guide means along substantially its entire length.

17. A curtain assembly comprising an open frame for viewing a television screen or the like located therebehind, parallel rolls mounted along opposite side edges of said frame, a flexible curtain rigidly attached to said rollers and adapted to unroll from either roll and roll on the other and extend across said frame, said curtain having an open portion to expose said frame in one end position and a screening portion to cover said frame in another end position, drive means connected to each of said rolls, and common means for positively driving said drive means at the same speed, and means for terminating the movement of said common means for establishing end limits between which said common means may move, said end limits being coordinated with the end positions of said curtain.

18. A curtain assembly comprising a frame, parallel rolls mounted along opposite side edges of said frame, a flexible curtain rigidly attached to said rolls and adapted to roll spirally thereon, and adapted to unroll from either roll and roll on the other, with an intermediate portion extending across said frame, said curtain having an open portion to expose said frame when in one end position and a screening portion to cover said frame in another end position, and means for driving said rolls in unison, whereby to increase the lengthwise tension on said curtain as end positions are approached.

19. A curtain assembly comprising a frame, parallel rolls mounted along opposite side edges of said frame, a flexible curtain rigidly attached to said rolls and adapted to roll spirally thereon, and adapted to unroll from either roll and roll on the other, with an intermediate portion extending across said frame, said curtain having an open portion to expose said frame when in one end position and a screening portion to cover said frame in another end position, a stiffening member extending across said curtain between the screening and open portions, and means for driving said rolls in unison, whereby to increase the lengthwise tension on said curtain as end positions are approached.

20. A curtain assembly comprising a frame, parallel rolls mounted along opposite side edges of said frame, a flexible curtain rigidly attached to said rolls and adapted to roll spirally thereon, and adapted to unroll from either roll and roll on the other, with an intermediate portion extending across said frame, said curtain having an open portion to expose said frame when in one end position and a screening portion to cover said frame in another end position, a stiffening member extending across said curtain between the screening and open portions, means including frame-supported guides and curtain-carried elements extending along the other side edges of said frame and along the opposite edges of said curtain, respectively, for laterally tensioning said curtain, and means for driving said rolls in unison, whereby to increase the lengthwise tension on said curtain as end positions are approached.

21. A curtain assembly comprising a frame, parallel rolls mounted along opposite side edges of said frame, a flexible curtain rigidly attached to said rolls and adapted to roll spirally thereon, and adapted to unroll from either roll and roll on the other, with an intermediate portion extending across said frame, said curtain having an open portion to expose said frame when in one end position, and a screening portion to cover said frame in another end position, means for driving said rolls in unison, whereby to increase the lengthwise tension on said curtain as the closed end position is approached, and means coordinated with said driving means for terminating movement thereof at a fixed position for establishing said closed position.

22. A curtain assembly comprising a frame, parallel rolls mounted along opposite side edges of said frame, a flexible curtain rigidly attached to said rolls and adapted to roll spirally thereon, and adapted to unroll from either roll and roll on the other, with an intermediate portion extending across said frame, said curtain having an open portion to expose said frame when in one end position, and a screening portion to cover said frame in another end position, a stiffening member extending across said curtain between the screening and open portions, means for driving said rolls in unison, whereby to increase the lengthwise tension on said curtain as the closed end position is approached, and means coordinated with said driving means for terminating movement thereof at a fixed position for establishing said closed position.

23. A curtain assembly comprising a frame, parallel rolls mounted along opposite side edges of said frame, a flexible curtain rigidly attached to said rolls and adapted to roll spirally thereon, and adapted to unroll from either roll and roll on the other, with an intermediate portion extending across said frame, said curtain having an open portion to expose said frame when in one end position, and a screening portion to cover said frame in another end position, a stiffening member extending across said curtain between the screening and open portions, means including frame-supported guides and curtain-carried elements extending along the other side edges of said frame and along the opposite edges of said curtain, respectively, for laterally tensioning said curtain, means for driving said rolls in unison, whereby to increase the lengthwise tension on said curtain as the closed end position is approached, and means coordinated with said driving means for terminating movement thereof at a fixed position for establishing said closed position.

24. A curtain assembly comprising a frame, parallel rolls mounted along opposite side edges of said frame, a flexible curtain rigidly attached to said rolls and adapted to roll spirally thereon, and adapted to unroll from either roll and roll on the other, with an intermediate portion extending across said frame, said curtain having an open portion to expose said frame when in one end position and a screening portion to cover said frame in another end position, and means for driving said rolls in unison, whereby to increase the lengthwise tension on said curtain as end positions are approached, said means including like sprockets drivably connected to said rolls and a chain.

25. A curtain assembly comprising a frame, parallel rolls mounted along opposite side edges of said frame, a flexible curtain rigidly attached to said rolls and adapted to roll spirally thereon, and adapted to unroll from either roll and roll on the other, with an intermediate portion extending across said frame, said curtain having an open portion to expose said frame when in one end position and a screening portion to cover said frame in another end position, means for driving said rolls in unison, whereby to increase the lengthwise tension on said curtain as end positions are approached, said means including like sprockets drivably connected to said rolls and a chain, and stop mechanism for establishing said end positions including a member carried by said chain.

JOHN H. LUCKIE.

References Cited in the file of this patent

UNITED STATES PATENTS

| Number | Name | Date |
|---|---|---|
| 484,978 | Rich | Oct. 25, 1892 |
| 730,440 | Duchemin | June 9, 1903 |
| 797,652 | Wilson | Aug. 22, 1905 |
| 881,507 | Wallen | Mar. 10, 1908 |
| 924,255 | Martin | June 8, 1909 |
| 953,837 | Haynes | Apr. 5, 1910 |
| 957,207 | Harrison | May 10, 1910 |
| 970,130 | Smith | Sept. 13, 1910 |
| 1,068,011 | Shmit | July 22, 1913 |
| 1,259,549 | O'Neill | Mar. 19, 1918 |
| 1,539,774 | Sato | May 26, 1925 |
| 1,677,230 | De Mercurio | July 17, 1928 |
| 1,741,922 | Dixson | Dec. 31, 1929 |
| 1,762,480 | Marenti | June 10, 1930 |
| 1,764,880 | Nelson | June 17, 1930 |
| 1,922,389 | Nye | Aug. 15, 1933 |
| 2,343,369 | Derman | Mar. 7, 1944 |
| 2,407,784 | Hoffstad | Sept. 17, 1946 |
| 2,501,454 | Schueren | Mar. 21, 1950 |
| 2,513,152 | Delivuk | June 27, 1950 |